United States Patent Office 3,373,036
Patented Mar. 12, 1968

3,373,036
ESTROGENIC COMPOUNDS AND ANIMAL GROWTH PROMOTERS
Edward B. Hodge, Phil H. Hidy, and Herbert L. Wehrmeister, Terre Haute, Ind., assignors to Commercial Solvents Corporation, a corporation of Maryland
No Drawing. Continuation-in-part of application Ser. No. 561,410, June 29, 1966. This application Mar. 3, 1967, Ser. No. 620,286.
10 Claims. (Cl. 99—2)

ABSTRACT OF THE DISCLOSURE

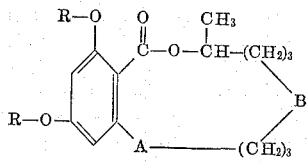

where R is selected from the group consisting of hydrogen, benzyl and lower alkyl, A is a radical selected from the group consisting of —CH=CH— and —CH$_2$—CH$_2$— and B is a radical selected from the group consisting of —CH$_2$—CO— and —CO—CH$_2$—, and animal feeds containing growth promoting amounts thereof.

---

This application is a continuation-in-part of application Ser. No. 561,410, filed June 29, 1966 now abandoned.

The present invention relates to new compounds and an object of the present invention is to provide compounds which exhibit estrogenic activity of aid in increasing the rate of growth in meat-producing animals, e.g., cattle, lamb and swine.

The compounds of this invention are illustrated by the formula:

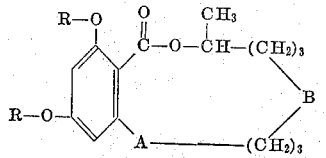

where A is —CH$_2$—CH$_2$— or —CH=CH—; R is hydrogen, substituted or unsubstituted alkyl, e.g., lower alkyl such as methyl, ethyl, hexyl, etc. or aralkyl, e.g., benzyl; and B is —CH$_2$—CO— or —CO—CH$_2$—.

The compounds of the present invention can be produced from the compound:

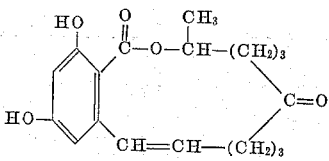

hereinafter referred to as the fermentation estrogenic substance (F.E.S.) by enlargement through reaction with diazomethane. The hydroxyl groups should be protected against undesirable side reactions before ring enlargement which can be accomplished by converting them to ethers, e.g., methyl ethers as taught in U.S. Patent 3,239,342 or benzyl ethers as taught in application Ser. No. 532,113, filed Mar. 7, 1966 now abandoned, and application Ser. No. 620,259, filed Mar. 3, 1967, and subsequently removing the masking group to regenerate the hydroxyl group. The hydroxyl group can be regenerated from, for example, a methyl ether by hydrolysis or by refluxing in acetic acid solution with hydrobromic acid. Benzyl groups are removed by reduction. Aluminum chloride is another effective dealkylating agent.

The compounds can be administered to animals by any suitable method including oral and parenteral administrations. For example, the compound can be blended with ordinary feed containing nutritional values in an amount sufficient to produce the desired rate of growth and can thus be fed directly to the animals, or the compound can be suspended in a suitable injection suspension medium such as peanut oil and injected parenterally. The amount of compound fed to an animal, of course, varies depending upon the animal, desired rate of growth and the like.

When the new compounds are to be administered in feeds, an animal feed composition may be prepared containing the usual nutritionally-balanced quantities of carbohydrates, proteins, vitamins and minerals, together with the compound of the present invention. Some of these usual dietary elements are grains, such as ground grain and grain by-products; animal protein substances, such as those found in fish meal and meat scraps, vegetable proteins like soybean oil meal or peanut oil meal; vitaminaceous materials, e.g., vitamin A and D mixtures; riboflavin supplements and other vitamin B complex members; and bone meal and limestone to provide minerals. A type of conventional feed material for use with cattle includes alfalfa hay and ground corn cobs together with supplementary vitaminaceous substances if desired.

The following examples serve to further illustrate the invention.

Example I

F.E.S. 2,4-dimethylether is mixed with excess diazomethane in dry ether at 0° C. and methanol is slowly added whereupon nitrogen is released. After the reaction subsides, the mixture is allowed to stand at room temperature for about 3 days and then filtered. The products are:

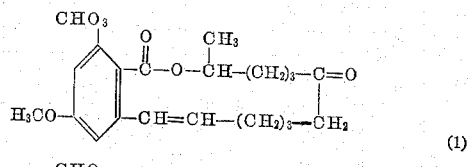

(1)

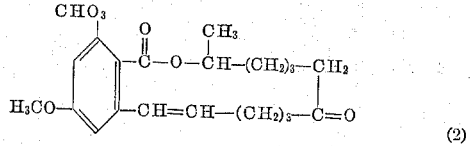

(2)

Example II

Compound (1) is demethylated by heating at 120° C. in benzene with two equivalents of aluminum chloride to produce:

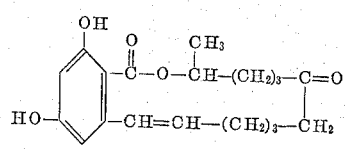

Example III

The large ring of dihydro F.E.S. 2,4-diethylether and F.E.S. 2,4-dibenzylether are enlarged according to the process of Example I to produce the corresponding F.E.S. derivatives.

Example IV

Six head of cattle are fed a daily ration of alfalfa, hay and ground corn cobs containing from 5 to 20 ounces per 100 pounds of feed of compound 1 of Example I and their rate of growth is improved.

Example V

Six head of cattle are fed a daily ration of alfalfa hay and ground corn cobs containing from 5 to 20 ounces per 100 pounds of feed of the compound produced in Example II to improve their rate of growth.

The following are specific examples of animal feed compositions of this invention useful for increasing the rate of growth and feed efficiency of young animals to market weight.

Example VI

For young beef cattle, i.e., calves to yearlings running to two years olds, each animal is given 5 to 20 milligrams per day of the compound produced in Example I intimately admixed in about 18 to 22 pounds per head per day of a complete pelleted ration for about 180 days. The complete pelleted ration includes in addition to the compound of Example I the following:

| | | |
|---|---|---|
| Barley | percent | 40–43 |
| Molasses dried beet pulp | do | 34.5–37.5 |
| Alfalfa pellets | do | 8.0 |
| Tallow | do | .30 |
| Calcium carbonate | do | .30 |
| Urea | do | .30 |
| Phosphorus source | do | .40 |
| Salt | do | .50 |
| Molasses | do | 10.00 |
| Trace mineral | do | 0.5 |
| Vitamin A | MMI.U/ton | 2–4 |

*Note.*—Milo or corn, for example, can be substituted for the barley.

The compound of Example I is admixed with the above ingredients in a stationary blender or a feed mix truck in the following amounts in grams per ton to provide an appropriate complete pelleted feed with dosage levels ranging from 5 to 90 milligrams per head per day.

| Grams/ton: | Mg./head/day |
|---|---|
| .5 | 5 |
| 1.0 | 10 |
| 2.0 | 20 |
| 4.0 | 40 |
| 8.0 | 80 |

These gram amounts are premixed with, for example, 10 pounds of soybean hulls prior to admixture with the other ingredients.

Example VII

For young swine, i.e., six-week-old pigs to about 100-pound pigs, each animal is given 5 to 20 milligrams per day of the compound of Example II intimately admixed in about 1½ to 5½ pounds per head per day of a grower ration until it reaches a weight of about 100 pounds. When the swine weigh between 90 and 125 pounds the feed is changed to one whereby each animal is given 20 to 50 milligrams per day of the compound of Example II intimately admixed in about 5½ to 10 pounds per head per day of a finisher ration until it reaches market weight of about 220 pounds. The grower and finisher ration include in addition to the compound of Example II the following:

| | Grower, Percent | Finisher, Percent |
|---|---|---|
| Ground Yellow Corn | 77 | 86.7 |
| Soybean Meal (44% protein) | 16 | 6.5 |
| Meat and Bone Scraps (50% protein) | 2.5 | 2.5 |
| Dehydrate Alfalfa Meal (17%) | 2.5 | 2.5 |
| Steamed Bone Meal | 0.5 | 0.5 |
| Ground Limestone | 0.5 | 0.3 |
| Iodized Salt | 0.5 | 0.5 |
| Vitamin, Antibiotic and Trace Mineral Premix | 0.5 | 0.5 |

The compound of Example II is admixed with the above ingredients in a blender in the following amounts in milligrams per pound to provide an appropriate feed with dosage levels ranging from 6 to 96 milligrams per head per day.

| Mg./pound | Mg./head/day |
|---|---|
| 2 | 6 |
| 4 | 12 |
| 8 | 24 |
| 16 | 48 |
| 32 | 96 |

Examples VIII

For 4- to 10-months old lambs weighing 50 to 70 pounds, each animal is given 1 to 15 milligrams per day of the compound of Example I, intimately admixed in about 3 to 6 pounds per head per day of a complete ration for 30 to 90 days. The complete ration includes in addition to the compound of Example I the following:

| | Pounds |
|---|---|
| Finely ground corn cobs | 630 |
| Ground corn | 600 |
| Dehydrated alfalfa meal | 300 |
| Dried molasses | 120 |
| Soybean meal (44% protein) | 300 |
| Dicalcium phosphate | 14 |
| Trace mineral salt | 17 |
| Premix vitamin, mineral and antibiotic | 19 |

The compound of Example I is admixed with the above ingredients in a blender in the following amounts in milligrams per pound to provide an appropriate complete feed with dosage levels ranging from 1 to 15 milligrams per head per day.

| Mg./pound | Mg./head/day |
|---|---|
| .5 | 2 |
| 1.0 | 4 |
| 1.5 | 6 |
| 2.0 | 8 |
| 2.5 | 10 |
| 3.75 | 15 |

Example IX

For broilers, i.e., day-old to four-week-old chicks, a grower feed is prepared for feeding to the chicks for the first four weeks and a finisher feed is prepared for feeding the four week old chicks for the last five weeks until they reach market weight of two and a half to three pounds dressed. For each pound of weight gain, the chicks eat about 1.5 to 2 pounds of feed. Thus they eat about 1.5 pounds of feed during the first four weeks and about five pounds of feed during the next five weeks. During the course of this feeding schedule, each bird should receive a total of about 12 to 36 milligrams of the compound of Example II in the grower and finisher feed each of which includes in addition to the compound of Example II the following:

| | Grower (lbs.) | Finisher (lbs.) |
|---|---|---|
| Ground Yellow Corn | 1,000 | 1,200 |
| Soybean Meal (44% Protein) | 700 | 500 |
| Fish Meal (60% Protein) | 100 | 80 |
| Alfalfa Meal | 50 | 50 |
| Meat and Bone Scraps | 0 | 30 |
| Animal Fat | 80 | 80 |
| Dicalcium Phosphate | 35 | 40 |
| Iodized Salt | 10 | 10 |
| Limestone | 15 | |
| Premix Vitamins, Trace Minerals and Antibiotics | 10 | 10 |

It is claimed:

1.

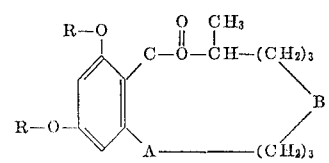

where R is selected from the group consisting of hydrogen, benzyl and lower alkyl, A is a radical selected from the group consisting of $$-CH=CH- \text{ and } -CH_2-CH_2-$$

and B is a radical selected from the group consisting of $CH_2-CO-$ and $CO-C_2-$.

2. The compound of claim 1 wherein R is lower alkyl.
3. The compound of claim 2 wherein A is $-CH=CH-$ and B is $-CH_2-CO$.
4. The compound of claim 2 wherein A is $-CH=CH-$ and B is $-CO-CH_2-$.
5. The compound of claim 2 wherein A is $$-CH_2-CH_2-$$

and B is $-CH_2-CO$.

6. The compound of claim 2 wherein A is $$-CH_2-CH_2-$$

and B is $-CO-CH_2-$.

7. The compound of claim 1 wherein R is hydrogen.
8. The compound of claim 1 wherein R is benzyl.
9. An animal feed composition comprising a nutrient ration and growth promoting amount of the compound of claim 1.
10. An animal feed composition comprising a nutrient ration and growth promoting amount of the compound of claim 3.

No references cited.

A. LOUIS MONACELL, *Primary Examiner.*

H. H. KLARE III, *Assistant Examiner.*

UNITED STATES PATENT OFFICE
CERTIFICATE OF CORRECTION

Patent No. 3,373,036                      May 12, 1968

Edward B. Hodge et al.

It is hereby certified that error appears in the above numbered patent requiring correction and that the said Letters Patent should read as corrected below.

Column 1, line 33, "of" should read -- or --; line 45, "wnere" should read -- where --. Column 2, lines 38 to 42, and lines 44 to 49, the left-hand portion of the formula, each occurrence, should appear as shown below:

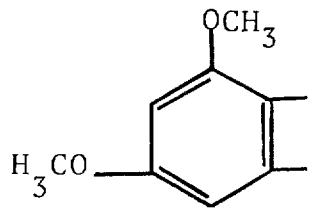

Column 3, line 2, after "alfalfa" insert a comma; line 22, ".30" should read -- 2.5 --. Column 5, line 7, "$CH_2$-CO- and CO-$C_2$-." should read -- -$CH_2$-CO- and -CO-$CH_2$-.--; line 17, "and B is -$CH_2$-CO." should read -- and B is -$CH_2$-CO-. --.

Signed and sealed this 21st day of October 1969.

(SEAL)
Attest:

EDWARD M. FLETCHER, JR.            WILLIAM E. SCHUYLER, JR.
Attesting Officer                    Commissioner of Patents